US010619687B2

United States Patent
Noh (10) Patent No.: US 10,619,687 B2
(45) Date of Patent: Apr. 14, 2020

(54) METHOD FOR FABRICATING MONOBLOCK BRAKE CALIPER FOR VEHICLE

(71) Applicant: KGC KUMKANG CO. LTD., Seoul (KR)

(72) Inventor: Jae Won Noh, Seoul (KR)

(73) Assignee: KGC KUMKANG CO., LTD., Seoul (KR)

( * ) Notice: Subject to any disclaimer, the term of this patent is extended or adjusted under 35 U.S.C. 154(b) by 100 days.

(21) Appl. No.: 15/574,622

(22) PCT Filed: May 31, 2016

(86) PCT No.: PCT/KR2016/005775
§ 371 (c)(1),
(2) Date: Nov. 16, 2017

(87) PCT Pub. No.: WO2016/204427
PCT Pub. Date: Dec. 22, 2016

(65) Prior Publication Data
US 2018/0149219 A1 May 31, 2018

(30) Foreign Application Priority Data
Jun. 16, 2015 (KR) ........................ 10-2015-0085049

(51) Int. Cl.
*F16D 65/00* (2006.01)
*B22D 19/00* (2006.01)
(Continued)

(52) U.S. Cl.
CPC ............ *F16D 65/0075* (2013.01); *B22C 9/10* (2013.01); *B22D 19/0072* (2013.01);
(Continued)

(58) Field of Classification Search
CPC .............. F16D 65/0075; F16D 55/228; F16D 2055/0033; F16D 2250/0015; F16D 55/22;
(Continued)

(56) References Cited

U.S. PATENT DOCUMENTS 5,037,143 A * 8/1991 Sanders .............. F16L 25/0036
138/121
2012/0325600 A1* 12/2012 Ruiz ................... F16D 65/0075
188/73.31
(Continued)

FOREIGN PATENT DOCUMENTS

| JP | 58-057522 A | 4/1983 |
| JP | H07-012156 A | 1/1995 |

(Continued)

OTHER PUBLICATIONS

International Search Report for PCT/KR2016/005775 dated Oct. 12, 2016 from Korean Intellectual Property Office.

*Primary Examiner* — John C Hong
(74) *Attorney, Agent, or Firm* — Paratus Law Group, PLLC (57) ABSTRACT

A method for manufacturing a monoblock brake caliper in which brake hydraulic lines, which are pipes, are provided inside a caliper body and a brake hose fixing device is provided on the outside the caliper body, and a plurality of cylinders are cast by sand casting. Prior to the casting process for forming the caliper body, the brake hydraulic lines are pressed into a sand cast, and then the caliper body is formed by the casting process. The brake hose fixing device comprises: a brake hose fixing omnidirectional bolt which fixes by rotating into a thread on the caliper body; the brake hose seated on the brake hose fixing omnidirectional bolt; and a fixing nut which fixes the brake hose fixing (Continued)

omnidirectional bolt and brake hose by rotating same from the center thereof.

3 Claims, 7 Drawing Sheets

(51) Int. Cl.
    *B22C 9/10*      (2006.01)
    *B60T 17/04*      (2006.01)
    *F16D 55/228*      (2006.01)
    *B22D 25/02*      (2006.01)
    *F16D 55/00*      (2006.01)
    *F16D 55/22*      (2006.01)

(52) U.S. Cl.
    CPC .............. *B22D 25/02* (2013.01); *B60T 17/04* (2013.01); *F16D 55/228* (2013.01); *F16D 55/22* (2013.01); *F16D 2055/002* (2013.01); *F16D 2055/0033* (2013.01); *F16D 2250/0015* (2013.01)

(58) Field of Classification Search
    CPC .............. F16D 2055/002; B22D 25/02; B22D 19/0072; B60T 17/04; B22C 9/10
    See application file for complete search history.

(56) References Cited

U.S. PATENT DOCUMENTS

2016/0184883 A1     6/2016   Arai et al.
2019/0024733 A1*   1/2019   Lee ................... F16D 55/228

FOREIGN PATENT DOCUMENTS

| JP | 2511957 Y2 | 9/1996 |
| JP | 2001-200868 A | 7/2001 |
| JP | 2015-059657 A | 3/2015 |
| KR | 20-1999-0015464 U | 5/1999 |

* cited by examiner

METHOD FOR FABRICATING MONOBLOCK BRAKE CALIPER FOR VEHICLE

CROSS REFERENCE TO PRIOR APPLICATIONS

This application is a National Stage Patent Application of PCT International Patent Application No. PCT/KR2016/005775 (filed on May 31, 2016) under 35 U.S.C. § 371, which claims priority to Korean Patent Application No. 10-2015-0085049 (filed on Jun. 16, 2015), which are all hereby incorporated by reference in their entirety.

BACKGROUND

Field of the Present Disclosure

The present disclosure relates to a method for fabricating a monoblock brake caliper for a vehicle. More particularly, the present disclosure relates to a method for manufacturing a monoblock brake caliper for a vehicle in which, prior to forming a caliper body, brake hydraulic lines in the form of a pipe are press-inserted into a sand core, and subsequently, a casting process for molding the caliper body is carried out, such that the brake hydraulic lines with a small diameter are formed inside the caliper body, and, thus, the pressure of a master cylinder introduced into the brake caliper can be quickly and uniformly transmitted to the plurality of pistons, and the brake hose may be fixed in any direction.

Discussion of Related Art

Prior arts relating to a brake caliper device in this technical field are as follows.

According to the photo posted on the Internet site (http://www.brembo.com/en/car/Racing/Street-products/Pages/Kit.aspx), the brake caliper (manufacturer: Brembo) with six pistons is commercially available.

Korean Utility Model Publication No. 20-1999-0015464 discloses a connector for mounting a brake hose for a vehicle. In this connector, a hollow cylindrical body 1 and a male threaded portion 2 are integrally formed to each other, and a fixing hole 4 is formed in the hollow cylindrical body 1 such that a brake hose 3 can be fixed using a screw. A receiving hole 5 is formed in the male threaded portion 2 so that a leading end of a brake hose 3 may be inserted into the hole 5. A nut 6 is fastened to the male threaded portion 2 to fix the brake hose 3, as provided in the receiving hole 5. An L-shaped connecting member 7 is disposed at a portion where the body 1 and the male threaded portion 2 are connected to each other. Thus, the connecting portion between the body 1 and the male threaded portion 2 is bent at a predetermined angle. Thus, the leading end of the brake hose 3 inserted and fixed into the connecting member 7 may be bent in a gentle angle. Thereby, the brake hose is prevented from being bent sharply even when the wheel is rotated, and the brake hose may be kept in a gentle angle state. As a result, it is possible to prevent poor durability of the hose due to the sudden bending of the brake hose or the incomplete transmission of the braking force due to the sudden bending.

PRIOR ART DOCUMENT

Patent Literature

Patent Document 1: Korean Utility Model Publication No. 20-1999-0015464 "Connector for mounting a brake hose for a vehicle"

SUMMARY

However, the brake caliper brake device according to the related prior art has the following problems.

First, since the brake hydraulic line is located outside the brake caliper, it may be damaged by protruding structures, debris, or external structures from the outside when driving or parking the vehicle.

Second, if the brake hydraulic line is placed inside the brake caliper, it is difficult to make the diameter of the brake hydraulic line small enough to be adapted to the mechanical pressure of the brake caliper in the core casting process. Thus, the hydraulic pressure transmission characteristic from the brake master to the brake pads is not good, and the brake responsiveness is deteriorated.

For example, each of brake hydraulic lines for a brake caliper comprising six cylinders is preferably shaped to have a thickness of 3 to 5 millimeters. However, the core casting process according to the prior art does not achieve such a thickness. As a result, the transmission characteristics of the brake hydraulic pressure from the brake master to the brake pads are not good, thereby deteriorating the brake responsiveness.

Third, in the conventional brake caliper, the brake hose fixing device is configured to be fixed only in a specific direction. This leads to a fact that there is a possibility that the brake caliper will move due to handling to the left or right, leading to failure or accidents.

Thus, the present invention will be made in order to solve the above-mentioned problems. The present disclosure is to provide a method for manufacturing a monoblock brake caliper for a vehicle in which, prior to forming a caliper body, brake hydraulic lines in the form of a pipe are press-inserted into a sand core, and subsequently, a casting process for molding the caliper body is carried out, such that the brake hydraulic lines with a small diameter are formed inside the caliper body, and, thus, the pressure of a master cylinder introduced into the brake caliper can be quickly and uniformly transmitted to the plurality of pistons, and the brake hose may be fixed in any direction.

Another object of the present invention is to provide a method for manufacturing a monoblock brake caliper for automobiles, which can neatly cut unnecessary parts of formed brake hydraulic lines.

In one aspect of the present disclosure, there is provided a method for manufacturing a monoblock brake caliper, wherein brake hydraulic lines are provided inside a caliper body, a brake hose fixing device is provided on an outer face of the caliper body, and a plurality of cylinders are cast-formed using a sand core, the method comprising: press-inserting brake hydraulic lines (31, 32 and 33) into a sand core prior to a casting process to form the caliper body 11, wherein the brake hydraulic lines include first to third brake hydraulic lines, wherein each of the brake hydraulic lines is divided into a portion to be planted into the body and a portion to be cut away (35) from the body based on a reference line (34), wherein an end of the portion to be cut away is blocked before the casting process such that casting material is prevented from flowing into the first to third brake hydraulic lines, wherein a groove having a depth sufficient for an operator to manually cut the line is defined in the reference line of each of the brake hydraulic lines; forming the caliper body (ii) using the casting process; cutting away the portion to be cut away (35) at the reference line (34); and fastening a brake hose fixing device (40) into a threaded hole formed in the caliper body (ii), wherein a brake hose fixing device (40) include: a brake hose fixing omnidirectional bolt fastened into the threaded hole formed in the caliper body (ii), wherein a top circumferential portion of the brake hose fixing omnidirectional bolt has a plurality of grooves defined therein, wherein at least three grooves are arranged along a circumferential direction at regular intervals; a brake hose (42) resting on the brake hose fixing omnidirectional bolt (41), wherein the brake hose (42) is received into one of the grooves of the brake hose fixing omnidirectional bolt (41); and a fixing nut (43) configured for fixation between the brake hose fixing omnidirectional bolt (41) and the brake hose (42).

In one embodiment, the brake hydraulic lines include first to third brake hydraulic lines, wherein each of the brake hydraulic lines is divided into a portion to be planted and a portion to be cut away (35) based on a reference line (34), wherein an end of the portion to be cut away is blocked before the casting process such that casting material is prevented from flowing into the first to third brake hydraulic lines.

In one embodiment, a first copper washer (44) is fastened between the fixing nut (43) and the brake hose (42), wherein a second copper washer (45) is fastened between the brake hose (42) and the brake hose fixing omnidirectional bolt (41).

According to a preferred effect of the present invention, not only the hydraulic lines are provided inside the brake caliper, but also the hydraulic lines may be formed thin. As a result, a uniform braking hydraulic pressure can be transmitted and the braking response is excellent. The pressure of the master cylinder introduced into the brake caliper can be transferred quickly and uniformly to the plurality of pistons.

In addition, not only can the brake hose be fixed in any direction, but also the diameter of the brake hydraulic line can be reduced, and the unnecessary parts of the formed hydraulic lines can be cut neatly.

DETAILED DESCRIPTION OF THE INVENTION

Hereinafter, the present invention will be described in detail with reference to the accompanying drawings.

Figure 1:
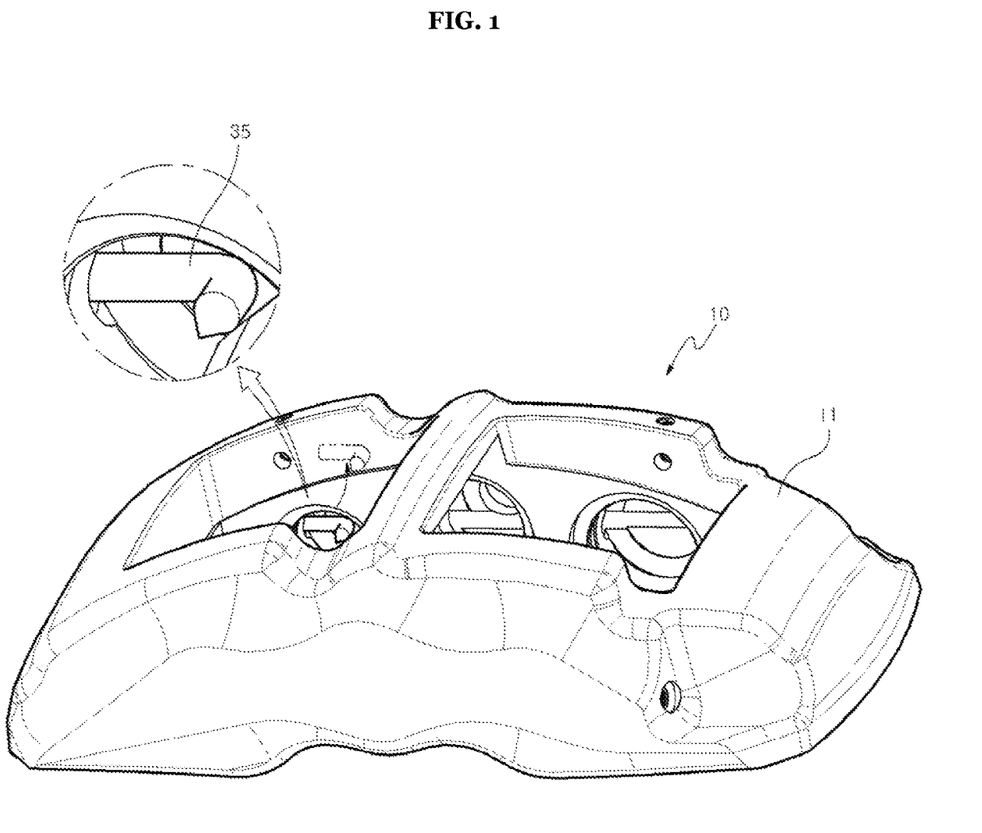
FIG. 1 is a perspective view of a monoblock brake caliper according to the present invention.

Although the monoblock brake caliper for a motor vehicle according to the present invention is manufactured through various steps, only details directly related to the key idea of the present invention will be described in detail for the sake of clarity Referring to FIG. 1, in a monoblock brake caliper 10, brake hydraulic lines are press-inserted into a sand core before casting a caliper body 11 so that brake hydraulic lines are disposed inside the caliper body. As a result, the pipe-type hydraulic brake lines are planted.

Figure 2:
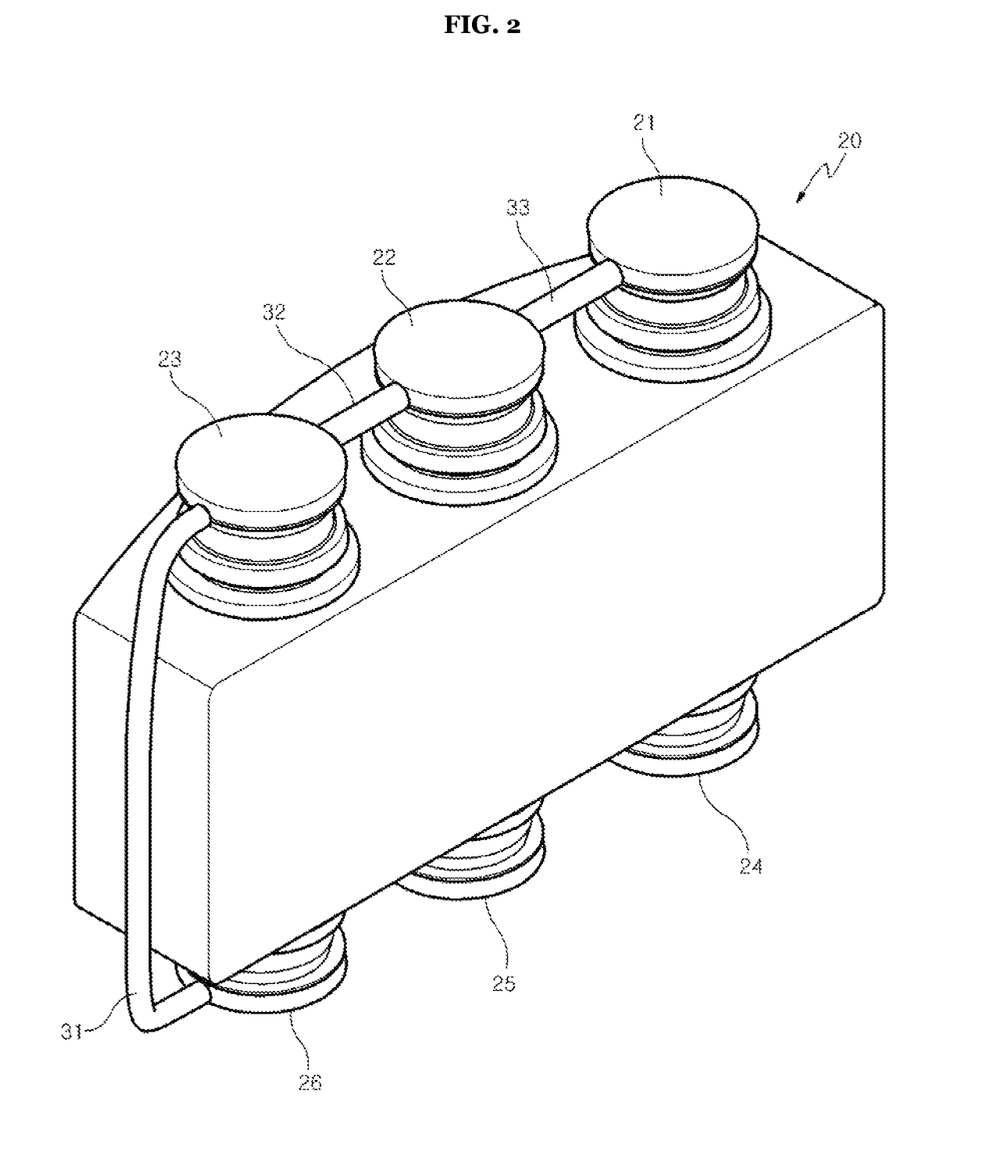
FIG. 2 is a perspective view showing a sand core of a cylinder for manufacturing a monoblock brake caliper and brake hydraulic lines according to the present invention.

That is, after first to third brake hydraulic lines 31, 32 and 33 are press-inserted into the sand core 20 as shown in FIG. 2, the caliper body 11 may formed through a casting process.

Therefore, since the brake hydraulic lines are not required to be formed by using the sand core, the brake hydraulic lines can be formed to have a thin thickness, and, thus, the brake caliper response ability can be generally improved.

In FIG. 2, reference numerals 21, 22, 23, 24, 25, and 26 denote the first to sixth cylinder cores, which are sand cores used for forming the cylinders of the brake caliper.

The detailed appearance of the first brake hydraulic line described above is shown in FIG. 3.

Figure 3:
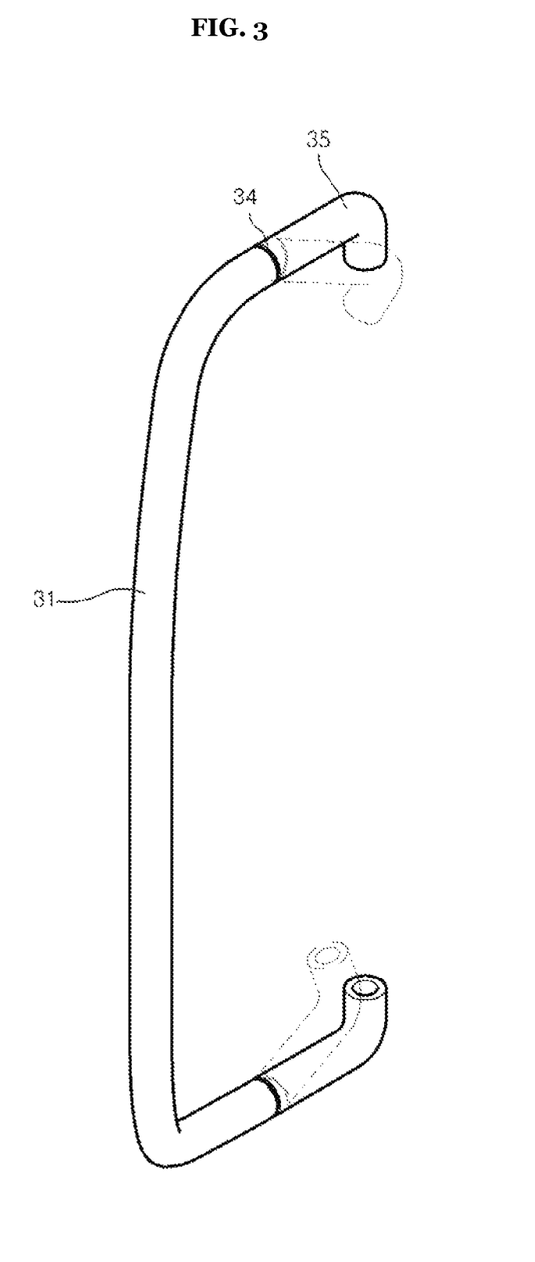
FIG. 3 is a perspective view showing a brake hydraulic line according to the present invention.

Referring to FIG. 3, a cut portion 35 of the first brake hydraulic line 31 is cut and discarded based on the reference line 34 after the casting process to mold the brake caliper. To this end, a concave groove is formed in a portion of the first brake hydraulic line 31 corresponding to the reference line 34.

Figure 4:
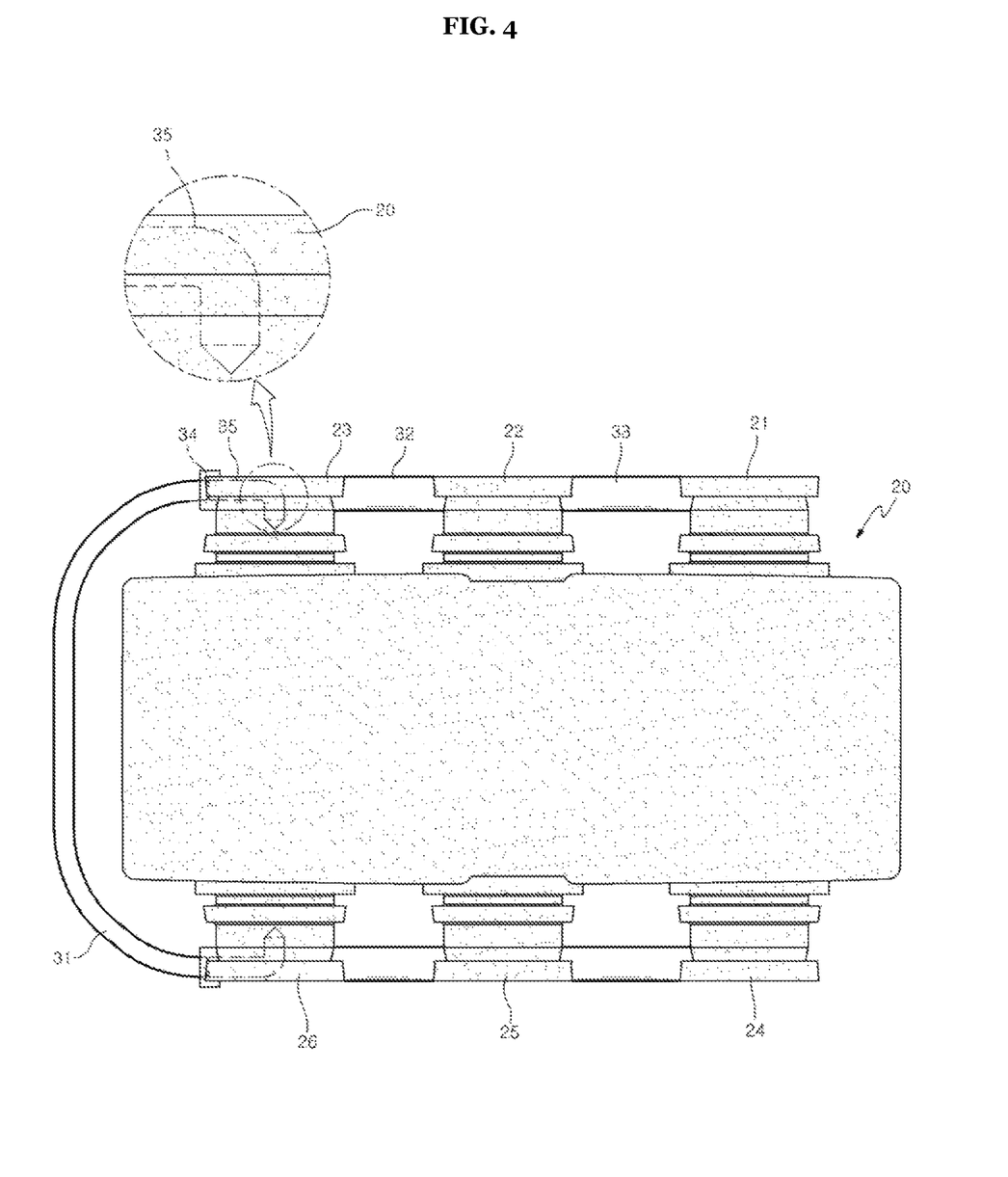
FIG. 4 is a plan view showing a state in which brake hydraulic lines are press-fitted into a sand core of a cylinder according to the present invention.

As shown in FIG. 4, prior to the casting process of forming the caliper body 11, the brake hydraulic lines 31 32 and 33 are press-inserted into the sand core, and then, the caliper body 11 is formed through the casting process.

That is, the brake hydraulic lines 31 32 and 33 are press-inserted into the sand core 20, and then the casting process of the caliper body 11 is performed. In this casting process, the end portions of the brake hydraulic lines 31 32 and 33 are bent so that casting metal does not enter the brake hydraulic lines 31 32 and 33.

Each of the brake hydraulic lines is divided into a portion to be planted, and a portion to be cut away, based on the reference line. The end of the cut portion of each of the brake hydraulic lines is blocked prior to the casting process so that so that casting material does not enter the brake hydraulic lines.

This is useful because the ends of the brake hydraulic lines 31 32 and 33 are very difficult to machine even with a tool, with considering the structural characteristics of the monoblock brake caliper that are monolithically cast.

Figure 5:
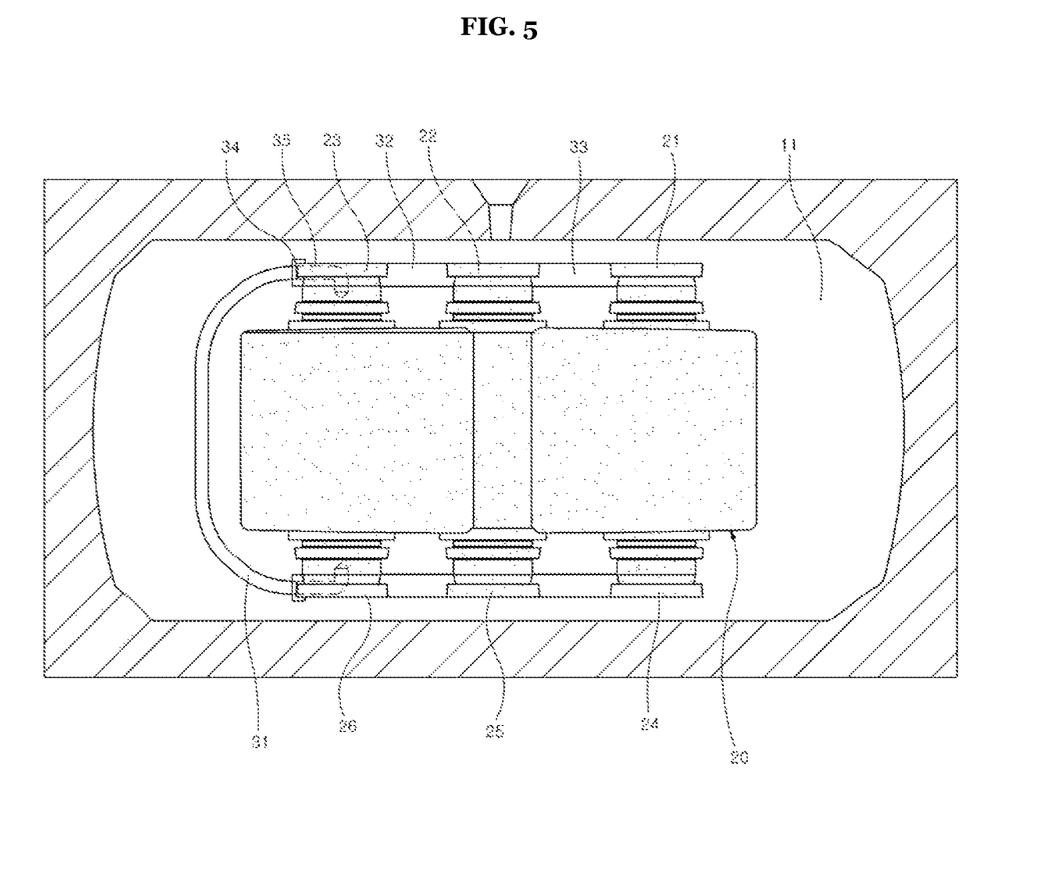
FIG. 5 is a plan view showing a molded monoblock brake caliper according to the present invention using a sand core.

When the casting process of the caliper body is performed, a product as shown in FIG. 5 may be produced.

Referring to FIG. 5, the sand core 20 is configured to allow formation of six cylinders. The first to third brake hydraulic lines 31 32 and 33 press-inserted into the sand core 20 are planted and molded.

Figure 6:
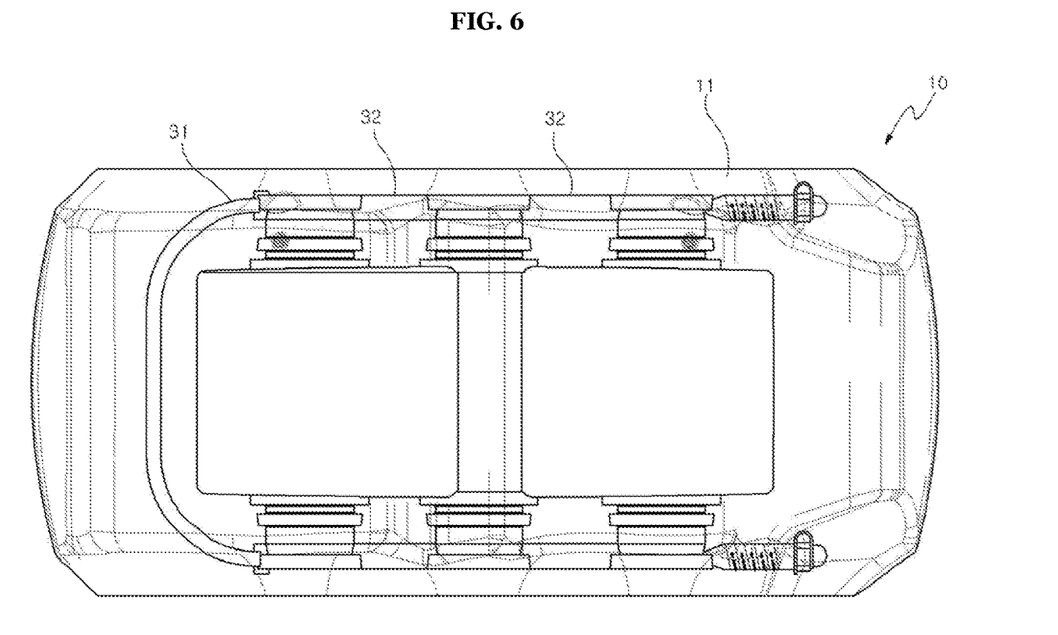
FIG. 6 is a plan view showing a state after removing the sand core according to the present invention.

The sand core is separated and removed by the vibration force from the brake caliper which has undergone the casting process, whereby the brake caliper as shown in FIG. 6 is formed.

Figure 7:
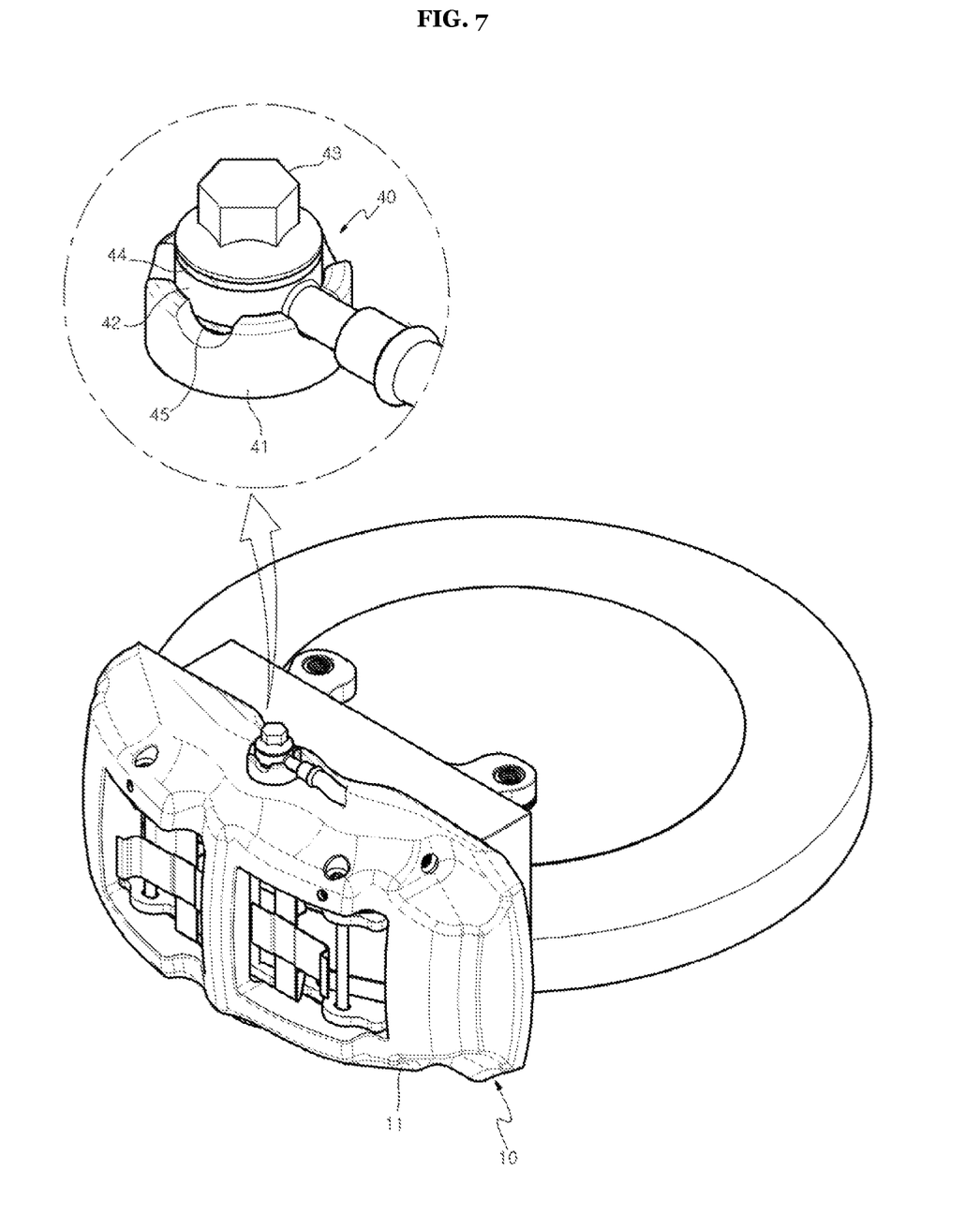
FIG. 7 is a partially enlarged perspective view of a brake hose fixing device of a monoblock brake caliper according to the present invention.

On the other hand, a brake hose fixing device 40 as shown in FIG. 7 is provided on an outer face of the caliper body. The caliper body has a threaded hole (not shown) defined therein such that the brake hose fixing device 40 is mounted on the caliper body using bolts.

Referring to FIG. 7, the brake hose fixing device 40 includes: a brake hose fixing omnidirectional bolt 41 fastened into the threaded hole formed in the caliper body 11, a brake hose 42 resting on the brake hose fixing omnidirectional bolt 41, and a fixing nut 43 for fixation between the brake hose fixing omnidirectional bolt 41 and the brake hose 42

In this connection, the top circumferential portion of the brake hose fixing omnidirectional bolt 41 fastened to the threaded hole formed in the caliper body 11 has a plurality of grooves defined therein. These grooves are arranged along a circumferential direction at regular intervals, and may be at least three or more. The brake hose 42 is inserted into one of the grooves of the brake hose fixing omnidirectional bolt 41. Thus, the brake hose can be oriented in all directions, i.e. all directions.

Further, a first copper washer 44 is fastened between the fixing nut 43 and the brake hose 42, while a second copper washer 45 is fastened between the brake hose 42 and the brake hose fixing omnidirectional bolt 41.

REFERENCE NUMERALS

| | |
|---|---|
| 10; monoblock brake caliper | 11; caliper body |
| 20; sand core | 21; first cylinder core |
| 22; second cylinder core | 23; third cylinder core |
| 24; fourth cylinder core | 25; fifth cylinder core |
| 26; sixth cylinder core | 31; first brake hydraulic line |
| 32; second brake hydraulic line | 33; third brake hydraulic line |
| 34; reference line | 35; cut portion |
| 40; brake hose fixing device | 41; brake hose fixing omnidirectional bolt |
| 42; brake hose | 43; fixing nut |
| 44; first copper washer | 45; second copper washer |

What is claimed is:

1. A method for manufacturing a brake caliper, the method comprising:

forming a sand core having at least one cylinder core corresponding to at least one cylinder of a caliper body;

preparing a plurality of brake hydraulic lines, including:

forming a cutting groove on a boundary, of each brake hydraulic line, between a first portion configured to be planted into the caliper body during a casting process and a second portion configured to be cut away from the caliper body after the casting process; and blocking an end of the second portion such that casting material is prevented from flowing into each brake hydraulic line during the casting process;

press-inserting the second portion of each brake hydraulic line into the at least one cylinder core of the sand core prior to the casting process;

forming the caliper body, in which the plurality of brake hydraulic lines are planted and which has a threaded hole formed thereon, using the casting process;

removing the sand core from the caliper body after the casting process;

cutting away, from the caliper body in which the plurality of brake hydraulic lines are planted, the second portion of each brake hydraulic line at the cutting groove; and fastening a brake hose fixing device into the threaded hole formed in the caliper body.

2. The method of claim 1, wherein the fastening the brake hose fixing device includes:

fastening a brake hose fixing omnidirectional bolt, which has a plurality of grooves arranged with regular intervals on a top circumferential portion thereof along a circumferential direction thereof, into the threaded hole formed on the caliper body;

resting a brake hose on the brake hose fixing omnidirectional bolt via one of the plurality of grooves; and fixing the brake hose to the brake hose fixing omnidirectional bolt using a fixing nut.

3. The method of claim 2, wherein the fastening the brake hose fixing device further includes:

fastening a first copper washer between the fixing nut and the brake hose; and fastening a second copper washer between the brake hose and the brake hose fixing omnidirectional bolt.

* * * * *